United States Patent
Giron et al.

(10) Patent No.: US 11,739,005 B2
(45) Date of Patent: Aug. 29, 2023

(54) LIQUID CRYSTALLIZER SALTING OUT SOLUTION

(71) Applicant: MIS IP Holdings, LLC, Houston, TX (US)

(72) Inventors: Rachel Guia Giron, Houston, TX (US); Ethan L. Demeter, The Woodlands, TX (US); Jeremy A. Willman, Tomball, TX (US)

(73) Assignee: MIS IP Holdings, LLC, Houston, TX (US)

( * ) Notice: Subject to any disclaimer, the term of this patent is extended or adjusted under 35 U.S.C. 154(b) by 190 days.

(21) Appl. No.: 17/332,684

(22) Filed: May 27, 2021

(65) Prior Publication Data

US 2021/0371300 A1    Dec. 2, 2021

Related U.S. Application Data

(60) Provisional application No. 63/033,190, filed on Jun. 1, 2020.

(51) Int. Cl.
| | |
|---|---|
| *C02F 1/00* | (2023.01) |
| *C02F 1/26* | (2023.01) |
| *C01F 11/30* | (2006.01) |
| *C01D 3/06* | (2006.01) |
| *B01D 9/00* | (2006.01) |

(Continued)

(52) U.S. Cl.
CPC ............... *C02F 1/265* (2013.01); *C01D 3/06* (2013.01); *C01F 11/30* (2013.01); *C02F 2101/10* (2013.01); *C02F 2103/08* (2013.01)

(58) Field of Classification Search
CPC .... C02F 1/00; C02F 1/26; C02F 1/265; C02F 1/52; C02F 1/5236; C02F 1/5272; C02F 1/54; C02F 1/58; C02F 2001/5218; C02F 2101/00; C02F 2101/10; C02F 2103/00; C02F 2103/007; C02F 2103/008; C02F 2103/08; C02F 2103/10; B01D 9/00; B01D 9/0063; B01D 9/02; B01D 11/00; B01D 11/02; B01D 11/0292; B01D 11/04; B01D 11/0415; B01D 11/0492; B01D 2239/04; B01D 2257/00; B01D 2557/80

See application file for complete search history.

(56) References Cited

U.S. PATENT DOCUMENTS

| | | |
|---|---|---|
| 4,658,057 A | 4/1987 | Koga et al. |
| 5,346,620 A | 9/1994 | Hendrix et al. |

(Continued)

FOREIGN PATENT DOCUMENTS

WO    2019/070134 A2    4/2019

OTHER PUBLICATIONS

Arnaiz, Francisco J. (1995). "A Convenient Way To Generate Hydrogen Chloride in the Freshman Lab," J. Chem. Educ. 72: 1139.

(Continued)

*Primary Examiner* — Allison G Fitzsimmons
(74) *Attorney, Agent, or Firm* — Morrison & Foerster LLP

(57) ABSTRACT

Disclosed herein is a method for recovering water from a salt solution. The method can include mixing the salt solution with a salting out solution that includes at least one enolizable ketone and at least one alcohol. The salting out solution can absorb the water from the salt solution and the water can be released using a regenerant solution. A base solution can also be added to fully regenerate the salting out solution so that it can be reused.

30 Claims, 8 Drawing Sheets

Process Flow Diagram of MEK:TBA Liquid Crystallizer

(51) Int. Cl.
  *C02F 103/08* (2006.01)
  *C02F 101/10* (2006.01)

(56) References Cited

U.S. PATENT DOCUMENTS

| | | |
|---|---|---|
| 5,705,074 A | 1/1998 | Brient |
| 2020/0023316 A1 | 1/2020 | Briggs |

OTHER PUBLICATIONS

Bischoff et al. (2016). "The generation of HCl in the system $CaCl_2$—$H_2O$: Vapor-liquid relations from 380-500C," Geochimica et Cosmochimica Acta 60: 7-16.

International Search Report and Written Opinion dated Sep. 24, 2021, directed to PCT/US21/34427; 17 pages.

Process Flow Diagram of MEK:TBA Liquid Crystallizer

Step 1: Water Absorption

Step 1: Water Absorption (1) $CaCl_2 + 2H_2O \rightleftharpoons Ca(OH)_2 + 2HCl$ (2)

(3)

Step 2: Addition of CaCl$_2$ to recover water

Step 3: Addition of NaOH to Salting Out Solution

Process Flow Diagram of MEK:TBA Liquid Crystallizer with NaOH regeneration

| Method | Brine added (mL) | Salting Out? | Regenerant (mL) | 1st Cycle Total Aqueous Layer (mL) | % Water Recovery | NaOH (mL) | Volume of solution (mL) | 2nd Cycle Brine added (mL) | Salting Out? | Observations |
|---|---|---|---|---|---|---|---|---|---|---|
| MEK only | | | CaCl₂ | | | | | | | |
| MEK only | 0.3 | Yes | 1 | 1.3 | 100.00% | 0 | 9 | 0.3 | Yes | aqueous layer with some salt |
| MEK only | 0.3 | Yes | 1 | 1.3 | 100.00% | 0.5 | 9 | 0.3 | No | no salt, single phase |
| With Amines | | | Citric Acid | | | | | 0.3 | | |
| 1:1 TEA:MEK | 0.3 | Yes | 0.3 | 0.7 | 133.33% | 0 | 9 | 0.3 | No | no salt, two phases |
| 1:4 TEA:MEK | 0.3 | Yes | 0.3 | 0.6 | 100.00% | 0 | 9 | 0.3 | No | no salt, two phases |
| 1:2 TEA:MEK | 0.3 | Yes | 0.3 | 0.7 | 133.33% | 0 | 9 | 0.3 | Yes | aqueous layer with some salt |
| 1:9 TEA:MEK | 0.3 | Yes | 0.3 | 0.6 | 100.00% | 0 | 9 | 0.3 | No | no salt, two phases |
| 1:50 TEA:MEK | 0.3 | Yes | 0.7 | 0.8 | 33.33% | 0 | 9 | 0.3 | No | no salt, two phases |
| 1:100 TEA:MEK | 0.3 | Yes | 0.7 | 0.8 | 33.33% | 0 | 9 | 0.3 | No | no salt, two phases |
| 1:1 DEA:MEK | 0.3 | Yes | 1 | 1.3 | 100.00% | 0 | 9 | 0.3 | Yes | aqueous layer with some salt |
| 1:4 DEA:MEK | 0.3 | Yes | 0.6 | 0.9 | 100.00% | 0 | 9 | 0.3 | Yes | aqueous layer with some salt |
| 1:9 DEA:MEK | 0.3 | Yes | 0.4 | 0.7 | 100.00% | 0 | 9 | 0.3 | No | no salt, two phases |
| 1:50 DEA:MEK | 0.3 | Yes | 0.2 | 0.5 | 100.00% | 0 | 9 | 0.3 | No | no salt, two phases |
| 1:100 DEA:MEK | 0.3 | Yes | 0.2 | 0.5 | 100.00% | 0 | 9 | 0.3 | No | no salt, two phases |
| 1:1 HA:MEK | 0.3 | Yes | 1.5 | single phase | 0.00% | 0 | N/A | N/A | N/A | no recovered solution |

FIG. 7

| | | | | | | | | | |
|---|---|---|---|---|---|---|---|---|---|
| 1:4 HA:MEK | 0.3 | Yes | 0.7 | 2.3 | 533.33% | 0 | 9 | 0.3 | No | no salt, two phases |
| 1:9 HA:MEK | 0.3 | Yes | 0.3 | 0.9 | 200.00% | 0 | 9 | 0.3 | No | no salt, two phases |
| 1:50 HA:MEK | 0.3 | Yes | 0.5 | single phase | 0.00% | 0 | N/A | N/A | N/A | no recovered solution |
| 1:100 HA:MEK | 0.3 | Yes | 0.5 | single phase | 0.00% | 0 | N/A | N/A | N/A | no recovered solution |
| 1:1 OA:MEK | 0.3 | Yes | 0.7 | single phase | 0.00% | 0 | N/A | N/A | N/A | no recovered solution |
| 1:4 OA:MEK | 0.3 | Yes | 0.7 | precipitation | 0.00% | 0 | N/A | N/A | N/A | no recovered solution |
| 1:9 OA:MEK | 0.3 | Yes | 0.5 | precipitation | 0.00% | 0 | N/A | N/A | N/A | no recovered solution |
| 1:50 OA:MEK | 0.3 | Yes | 0.5 | precipitation | 0.00% | 0 | N/A | N/A | N/A | no recovered solution |
| 1:100 OA:MEK | 0.3 | Yes | 0.5 | single phase | 0.00% | 0 | N/A | N/A | N/A | no recovered solution |
| With TBA | | | CaCl$_2$ | | | | | | | |
| 1:100 volume TBA:MEK (1:50 molar TBA:MEK) | 0.3 | Yes | 1 | 1.3 | 100.00% | 0.3 | 9 | 0.3 | Yes | mostly salt with some aqueous layer |
| 5:95 volume TBA:MEK (1:20 molar TBA:MEK) | 0.3 | Yes | 1 | 1.3 | 100.00% | 0.3 | 9 | 0.3 | Yes | mostly salt with some aqueous layer |
| 10:90 volume TBA:MEK (1:10 molar TBA:MEK) | 0.3 | Yes | 1 | 1.3 | 100.00% | 0.3 | 9 | 0.3 | Yes | mostly salt with some aqueous layer |
| 1:200 TBA:MEK | 0.3 | Yes | 1 | 1.2 | 66.67% | 0.3 | 8 | 0.3 | No | single phase |
| 1:200 TBA:MEK | 0.3 | Yes | 1 | 1.2 | 66.67% | 0.1 | 8 | 0.3 | Yes | aqueous layer with some salt |

Table of Solvent Screening Results

FIG. 7 CONT.

LIQUID CRYSTALLIZER SALTING OUT SOLUTION

CROSS-REFERENCE TO RELATED APPLICATIONS

This application claims the benefit of U.S. Provisional Application No. 63/033,190, filed Jun. 1, 2020, the entire contents of which are incorporated herein by reference.

FIELD

The present disclosure relates to a process for salting out brine to produce salt and water. More specifically, the present disclosure relates to a process in which a salting out solution is used to absorb water and crystallize salt to recover purified water.

BACKGROUND

Water treatment by desalination is an energy intensive and expensive process. An issue with typical desalination processes is that the recovery is typically limited to 75-85%. As such, the remainder can get discarded as wastewater. Zero liquid discharge (ZLD) is an advanced desalination strategy that combines technologies such as reverse osmosis, distillation, thermal evaporation, crystallization, and electrodialysis to recover processed water without producing liquid waste. Although ZLD processes provide a good solution for water treatment, the technologies that are being utilized are limited by energy efficiency, salinity range, and operation costs.

SUMMARY

A ZLD process that can potentially overcome some of the limitations described above is described in PCT Publication WO 2019/070134 to Aquafortus Technologies Limited, which is hereby incorporated by reference in its entirety. Their technology utilizes a salting out solution composed of an enolizable ketone and a tertiary amine that absorbs the water from the salt solution, thereby resulting in salt precipitation. However, tertiary amines, such as trimethylamine, are highly toxic and can pose issues when used in large quantities.

To resolve the problem with toxicity, Applicants explored other potential reagents. Specifically, Applicants discovered that in place of tertiary amines, alcohols (more specifically, tertiary alcohols) can be utilized in a salting out solution. The alcohol can act as a base that catalyses the tautomerization of the ketone to an enol which can then bind to water, thereby resulting in salt crystallization.

In some embodiments, a method for recovering water from a salt solution can include mixing a salt solution and a salting out solution in a first container to form solid salt and a water-absorbed salting out solution, wherein the salting out solution comprises an enolizable ketone and an alcohol; removing the water-absorbed salting out solution from the first container; mixing the water-absorbed salting out solution with a regenerant solution in a second container to release absorbed water from the water-absorbed salting out solution and form an organic phase and an aqueous phase in the second container; removing the aqueous phase from the second container; and desalinating the aqueous phase to produce purified water. In some embodiments, the method can include removing the organic phase from the second container and mixing the removed organic phase with a base solution in a third container to form a second organic phase and a second aqueous phase. In some embodiments, the method can include electrolyzing the second aqueous phase to form a recycled base solution. In some embodiments, the method includes recycling the recycled base solution to be used as the base solution mixed with the removed organic phase. In some embodiments, the method includes recycling the second organic phase to be used as the salting out solution mixed with the salt solution in the first container. In some embodiments, the base solution comprises NaOH. In some embodiments, desalinating the aqueous phase produces a recycled regenerant solution and the recycled regenerant solution is recycled to be used as the regenerant solution mixed with the water-absorbed salting out solution in the second container. In some embodiments, the enolizable ketone has the chemical formula: $R(C=O)R'$, wherein R and R' are independently selected from a C1-C7 alkyl or a C3-C7 monocyclic; R and R' are selected from a C1-C7 alkyl and the other is selected from a C1-C7 alkyl; R and R' together, with the carbonyl (C=0) form a 3-15 membered monocylic ketone or a 3-15 membered monocylic heterocyclic ketone; or R and R' together with the carbonyl form an 8-15 membered aromatic system optionally including one or more heteroatoms selected from S, N, or O. In some embodiments, the enolizable ketone is methyl ethyl ketone (MEK). In some embodiments, the alcohol is a tertiary alcohol. In some embodiments, the tertiary alcohol is tert-butyl alcohol (TBA). In some embodiments, the salt solution comprises salt water and/or a brine solution. In some embodiments, the regenerant solution comprises $CaCl_2$.

In some embodiments, a method includes mixing a salt solution and a salting out solution to form solid salt and a water-absorbed salting out solution, wherein the salting out solution comprises an enolizable ketone and an alcohol; mixing the water-absorbed salting out solution with a regenerant solution to release absorbed water from the water-absorbed salting out solution and to regenerate the enolizable ketone; and regenerating the alcohol using a base solution.

Additional advantages will be readily apparent to those skilled in the art from the following detailed description. The examples and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE DRAWINGS

Further details, advantages and features of the embodiments are found not only in the claims but there-in alone and/or in combination with the drawings. The drawings are as follows:

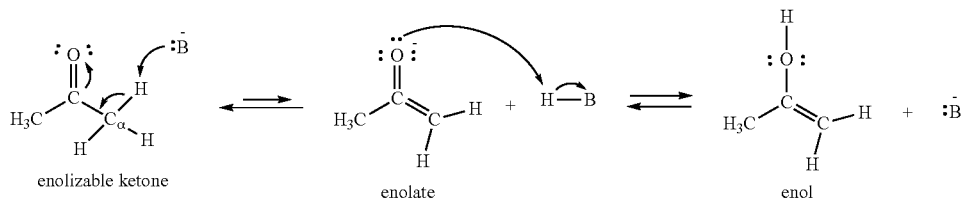

enolizable ketone    enolate    enol

FIG. 7 is a table of the results from chemical screening studies.

DETAILED DESCRIPTION

Applicants have discovered a method for recovering water from a salt solution. Specifically, Applicants method includes mixing a salt solution with a salting out solution. The salting out solution can absorb the water from the salt solution, thereby crystallizing the salt from the salt solution. The water-absorbed salting out solution can then be mixed with a regenerant solution such that the water is released from the water-absorbed salting out solution. Next, a base solution can be mixed with the regenerated salting out solution such that the salting out solution can be reused with the initial mixing with the salt solution. In some embodiments, the method can be a minimal liquid discharge process. In some embodiments, the method can be a zero liquid discharge process meaning a wastewater treatment process where no effluent, or discharge, is left over.

Figure 1:
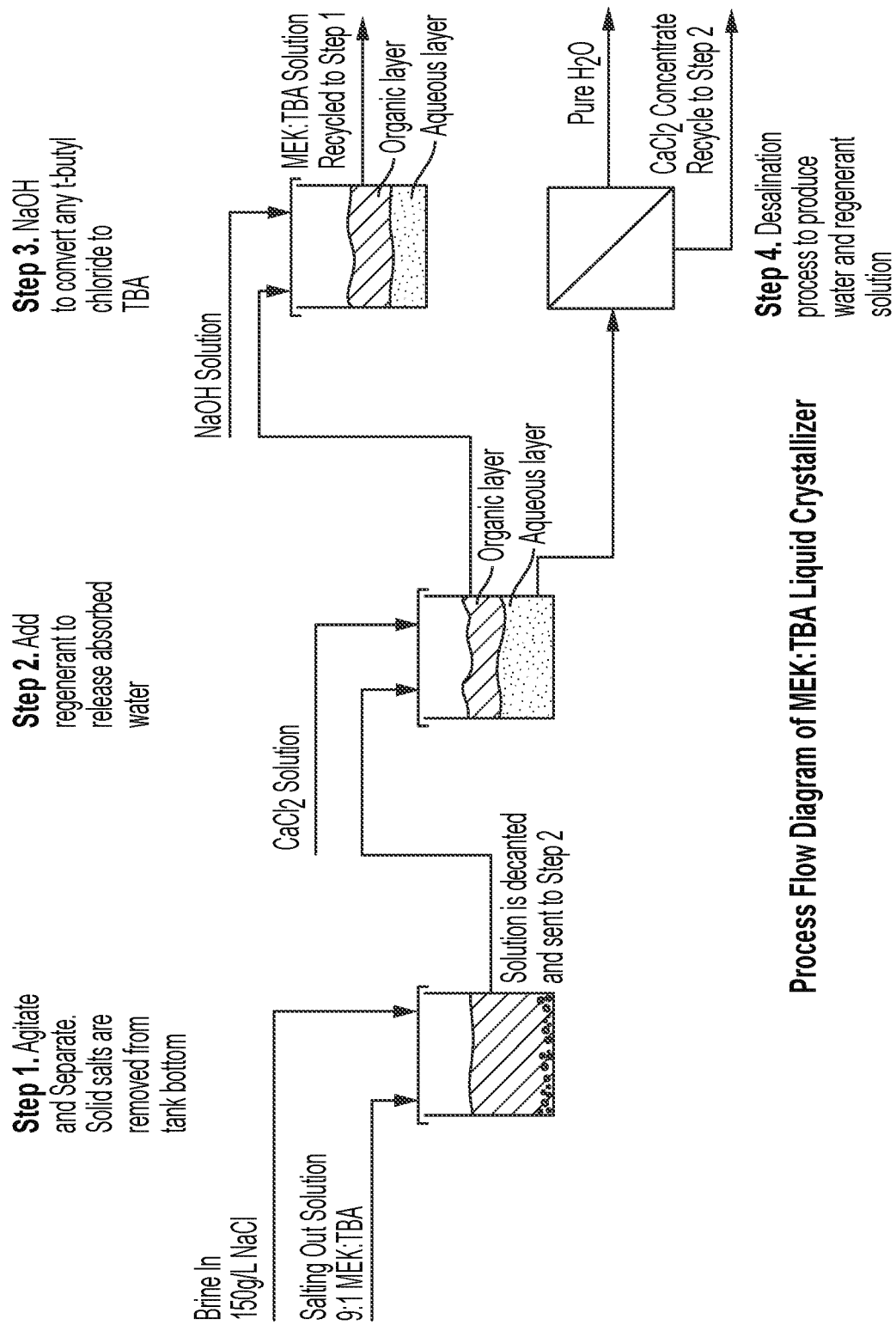
FIG. 1 is an illustrative flowchart of a method for recovering water from a salt solution in accordance with some embodiments disclosed herein.

FIG. 1 is an illustrative flowchart of a method for recovering water from a salt solution in accordance with some embodiments disclosed herein. In some embodiments, a salt solution (e.g., 150 g/L NaCl in FIG. 1) can be mixed with a salting out solution in a first container (e.g., a mixing vessel). In some embodiments, the salt solution can be salt water and/or a brine solution. The terms "brine" and "salt solution" can be used interchangeably and refer to a salt-containing aqueous solution. The salt in the solutions can include sodium chloride, but it can also contain other inorganic salts.

The salting out solution is designed to continually absorb water from an influent brine stream to supersaturate the salt concentration, causing crystallization. An effective salting out solution has a high capacity to absorb water and is hydrophobic enough to minimize the amount of organic material that partitions into the aqueous solution. In other words, the salting out solution must bond strongly enough to water such that it can precipitate the crystallization event, but not so strongly that the water from the salt solution drags the organic material into the aqueous solution. Afterwards, the salting out solution may be regenerated by exposing it to a combination of an aqueous salt solution (e.g., potassium chloride) and a concentrated caustic solution. The aqueous salt solution is designed to draw the absorbed water off of the salting out solution and create a two-phase mixture that can be easily separated. The concentrated caustic solution (e.g., sodium hydroxide) can remove the remaining adhered water from the salting out solution.

In some embodiments, the salting out solution can include at least one enolizable ketone and at least one alcohol. The term "enolizable ketone" can be a compound that has one or more carbonyl functional groups and wherein at least one of the carbonyl functional groups has alpha hydrogens that may be removed by a base to form an enolate and then an enol ("keto-enol tautomerization") as shown in the reaction scheme below:

The term "enol" refer to an alkene compound (C=C) that has a hydroxyl group (—OH) attached to one of the carbon ends connected by the double bond. The alcohol can act as a base that catalyzes the tautomerization of the ketone to an enol, which can then bind water resulting in salt crystallization. The enolizable ketone can be any of the "enolisable carbonyls" described in WO 2019/070134, which is incorporated by reference in its entirety. In some embodiments, the enolizable ketone can have the formula R(C=O)R', wherein R and R' are independently selected from a C1-C7 alkyl or a C3-C7 monocyclic; R and R' are selected from a C1-C7 alkyl and the other is selected from a C1-C7 alkyl; R and R' together, with the carbonyl (C=O) form a 3-15 membered monocylic ketone or a 3-15 membered monocylic heterocyclic ketone; or R and R' together with the carbonyl form an 8-15 membered aromatic system optionally including one or more heteroatoms selected from S, N, or O. In some embodiments, R and/or R' can be independently selected from methyl and ethyl. In some embodiments, R and/or R' are further substituted with one or more substituents selected from -halo, —OH, —CN, —NO$_2$, —C≡CH, —SH, -C1-C7 alkyl, —(C1-C7 alkyl)-OH, —NH$_2$, —NH(C1-C$_7$ alkyl), —N(C1-C$_7$ alkyl)$_2$, —O (C1-C$_7$ alkyl), —C(O)-O(-C C$_7$ alkyl), —C(O)OH; —C(O)-H, or —C(O)-(d-C$_7$ alkyl). In some embodiments, the enolizable ketone is methyl ethyl ketone (MEK).

In some embodiments, the alcohol can be a tertiary alcohol (i.e., a compound in which a hydroxyl group (—OH) is attached to a saturated carbon which has three other carbons attached to it). In some embodiments, the tertiary alcohol can be tert-butyl alcohol (TBA). In some embodiments, the molar ratio of alcohol to enolizable ketone in the salting out solution can vary from 9:1 to 1:200, from 1:50-1:150, from 1:75-1:125, from 1:90-1:110, or about 1:100.

Figure 2:
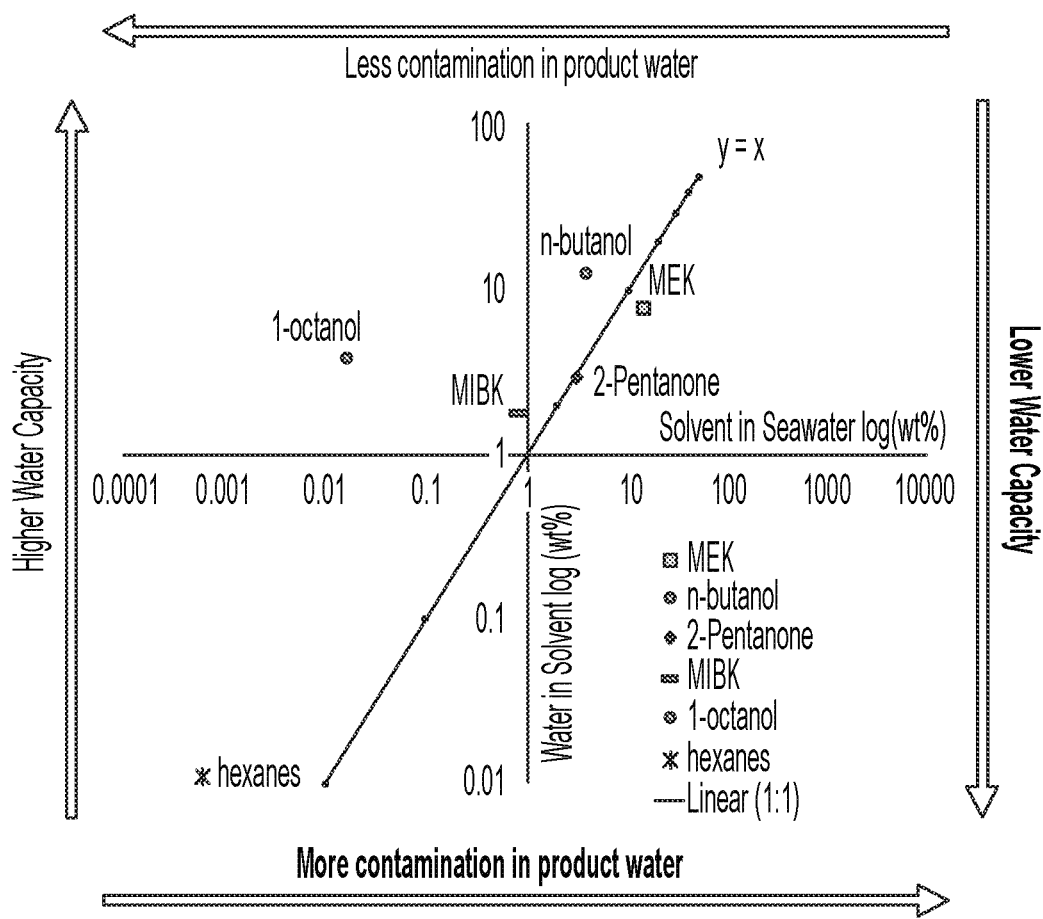
FIG. 2 shows a chart of the water capacity and contamination in water of various solvents.

In some embodiments, the salting out solution may comprise a ketone, an alcohol, an amphiphilic oxygenate, and a demulsifier. FIG. 2 shows a chart comparing the water capacity to contamination in product water for various solvents. This chart was used to achieve a salting out solution that comprises a ketone, an alcohol, an amphiphilic oxygenate, and a demulsifier. In some embodiments, the ketone may be methyl ethyl ketone (MEK) or methyl isobutyl ketone (MIBK). In some embodiments, the alcohol may include t-butanol (TBA). In some embodiments, the amphiphilic oxygenate may comprise a sulfonate or a phosphate. In some embodiments, the demulsifier may comprise a hexane.

The ketone and the alcohol each contribute to absorbing water in the first step of the process, leading to salt crystallization. The amphiphilic oxygenate, such as triisobutyl phosphate shown below, provides two benefits. First, it improves the water-absorption capacity of the salting out solution due to its polar end (O bonded to the central P or S atom) forming a hydrogen bond with water. Second, the presence of large non-polar substituents in the oxygenate additive prevents it from partitioning into the aqueous layer.

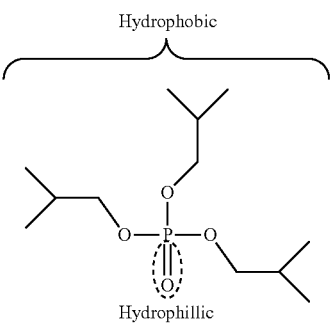 [SMILES: CC(C)COP(=O)(OCC(C)C)OCC(C)C]

Further, the water-immiscible demulsifier enhances the hydrophobicity of the salting out solution, resulting in minimum dissolution of the organic components into the aqueous phase and faster separation of the two phases. Example 2 described below, describes a salting out solution in more detail.

In some embodiments, a salting out solution may comprise 10-30 wt. % alcohol. In some embodiments, a salting out solution may comprise less than or equal to 30, 25, 20, or 15 wt. % alcohol. In some embodiments, a salting out solution may comprise greater than or equal to 10, 15, 20, or 25 wt. % alcohol. In some embodiments, a salting out solution may comprise 30-50 wt. % ketone. In some embodiments, a salting out solution may comprise less than or equal to 50, 45, 40, or 35 wt. % ketone. In some embodiments, a salting out solution may comprise greater than or equal to 30, 35, 40, or 45 wt. % ketone. In some embodiments, a salting out solution may comprise 10-30 wt. % amphiphilic oxygenate (e.g., phosphate). In some embodiments, a salting out solution may comprise less than or equal to 30, 25, 20, or 15 wt. % amphiphilic oxygenate (e.g., phosphate). In some embodiments, a salting out solution may comprise greater than or equal to 10, 15, 20, or 25 wt. % amphiphilic oxygenate (e.g., phosphate). In some embodiments, a salting out solution may comprise 10-30 wt. % demulsifier. In some embodiments, a salting out solution may comprise less than or equal to 30, 25, 20, or 15 wt. % demulsifier. In some embodiments, a salting out solution may comprise greater than or equal to 10, 15, 20, or 25 wt. % demulsifier.

Figure 3A:
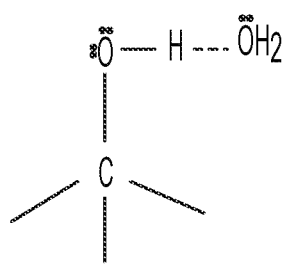
FIG. 3A shows exemplary simplified Lewis dot structures of the reaction that occurs between water and tert-Butyl alcohol.
Figure 3B:
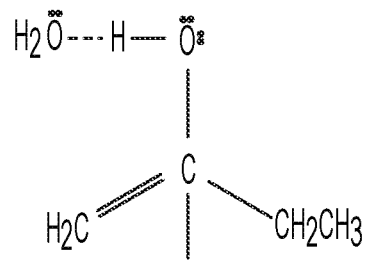
FIG. 3B shows exemplary simplified Lewis dot structures of the reaction that occurs between water and methyl ethyl ketone.

Mixing/agitating the salt solution and the salting out solution can cause the salt of the salt solution to crystallize into solid salt. This salt can then be removed from the first container. For example, it can be removed from the bottom of the first container. In addition, the salting out solution can absorb water from the salt solution to form a water-absorbed salting out solution. For example, FIGS. 3A and 3B shows the interaction between the compounds in the salting out solution (in this case TBA and MEK, respectively) and water of the salt solution. When the salt solution is added to the salting out solution, the salting out solution can absorb salt and reject salt. The water absorption can be possible because both TBA and the enol form of MEK can form hydrogen bonds with water.

FIG. 1 shows a 9:1 molar ratio of MEK and TBA being mixed with a concentrated salt solution or brine, denoted as a 150 g/L solution of sodium chloride. Upon mixing these two fluids, the salting out solution absorbs water from the brine, thereby supernating the salt. The salt can crystallize and fall to the bottom of the first container. As it is shown in FIG. 1, there is no aqueous solution remaining, but in practice there will likely be a small aqueous layer around the crystallized salt. The salting out solution with the absorbed water (i.e., water absorbed salting out solution) can have a lower density compared to the aqueous layer, if present, and can be removed by decantation for example. In some embodiments, the precipitated salt can be part of an aqueous layer that is separate from the water-absorbed salting out solution.

After the water-absorbed salting out solution is removed from the first container, it can be mixed with a regenerant solution in a second container to release the absorbed water. The regenerant solution can include a regenerant that can cause the water to be released from the water-absorbed salting out solution, thereby regenerating part of the salting out solution. In some embodiments, the regenerant can cause the water-absorbed enolizable ketone to release the water, thereby regenerating the enolizable ketone to its initial state in the salting out solution. In some embodiments, the regenerant can be a deliquescent salt (e.g., $CaCl_2$, sodium nitrate, potassium oxide). Deliquescent salts are substances that can absorb water readily from the air and are so successful at it that they can dissolve and form a solution.

Addition of saturated calcium chloride to the salting out solution may lead to the reaction between tert-butyl alcohol and hydrochloric acid. It has been reported by Bischoff, J. L. et al. in *Geochimica et Cosmochimica Acta*, 2016, 60, 7-16, and Arnaiz, F. J. in *J. Chem. Educ.* 1995, 72, 1139 that hydrochloric acid can be produced from calcium chloride and water. The mechanism of the synthesis of tert-butyl chloride from tert-butyl alcohol is shown below.

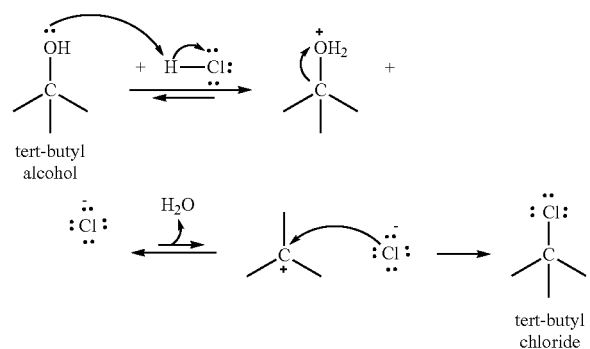

Figure 4:
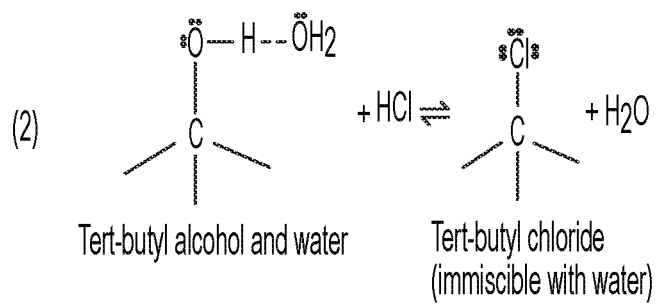
FIG. 4 shows exemplary simplified reactions that take place between the regenerant solution and the water-absorbed salting out solution with some embodiments disclosed herein.
Figure 4:
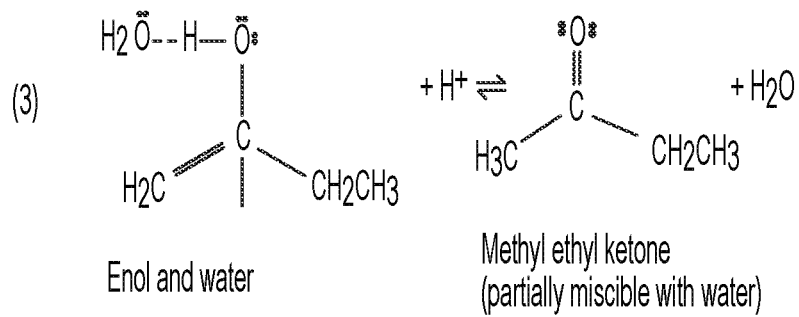

FIG. 4 show examples of the reactions that take place when a regenerant (e.g., calcium chloride, potassium chloride) is added to the water-absorbed salting out solution. Calcium chloride is a deliquescent salt and can therefore absorb water. Furthermore, hydrochloric acid can be produced when high concentrations of calcium chloride are present in water. For TBA and MEK, reactions with acid can break the hydrogen bonds to release water as shown in FIG. 4. For TBA, the reaction can yield t-butyl chloride and water. For MEK, the acid can catalyse the tautomerization from the enol form to the keto form, releasing water in the process.

The absorbed water can be recovered from the water-absorbed salting out solution using a calcium chloride solution. Calcium chloride can act as a chloride source that facilitates the reaction with the water-miscible tert-butyl alcohol to form the water-immiscible tert-butyl chloride. Calcium chloride is a deliquescent inorganic salt that is insoluble in MEK and can therefore bind to water absorbed in the organic salting out solution. In some embodiments, the calcium chloride solution is a solution comprising between about 1-450 g of calcium chloride per Liter of water. In some embodiments, the calcium chloride is anhydrous calcium chloride added directly to the salting out solution.

Upon addition and mixing of the regenerant, two distinct phases can be created in the second container: (1) an organic phase that includes the regenerated salting out solution; and (2) an aqueous phase that includes the regenerant and the water desorbed from the water-absorbed salting out solution. As explained above and shown in FIG. 5, the regenerated salting out solution of the organic phase can include the regenerated enolizable ketone as well as a chloride (e.g., a tertiary chloride (tert-Butyl chloride)). The organic phase can be removed for further regeneration of the salting out solution and the aqueous phase can be removed for desalination processing to create purified water. These two can be removed using decantation.

Figure 5:
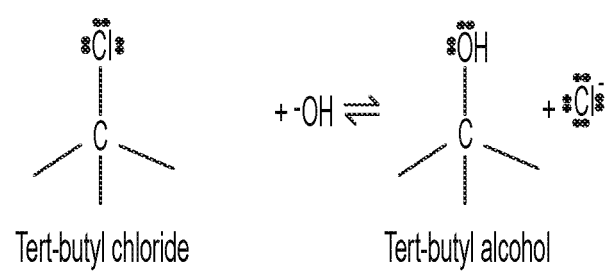
FIG. 5 shows exemplary simplified Lewis dot structures of the reaction that occurs between tert-Butyl chloride with a base solution.

The removed organic phase can be mixed with a base solution in a third container. In some embodiments, the base can cause the alcohol to return to its initial state in the salting out solution. As explained above, the alcohol can react with chloride ions to form a chloride (e.g., tertiary chloride) by exchanging the hydroxyl group for a chloride ions. To fully regenerate the salting out solution, these chloride ions can be exchanged for hydroxide ions by the addition of a base solution (e.g., sodium hydroxide). The term "base" can refer to a Lewis base, which is a compound that can donate an electron pair to an acceptor. FIG. 5 shows an example of the reaction of t-butyl chloride with sodium hydroxide to form t-butyl alcohol. Upon mixing the base solution with the removed organic phase in the third container, a second organic phase and a second aqueous phase can separate in the third container. This second organic phase can include the fully regenerated salting out solution (e.g., enolizable ketone and alcohol) which can be recycled and reused as the salting out solution that is mixed with the salt solution. The second aqueous phase can include the caustic, sodium hydroxide and can remain in the third container to be re-used with supplemental amounts as necessary.

Figure 6:
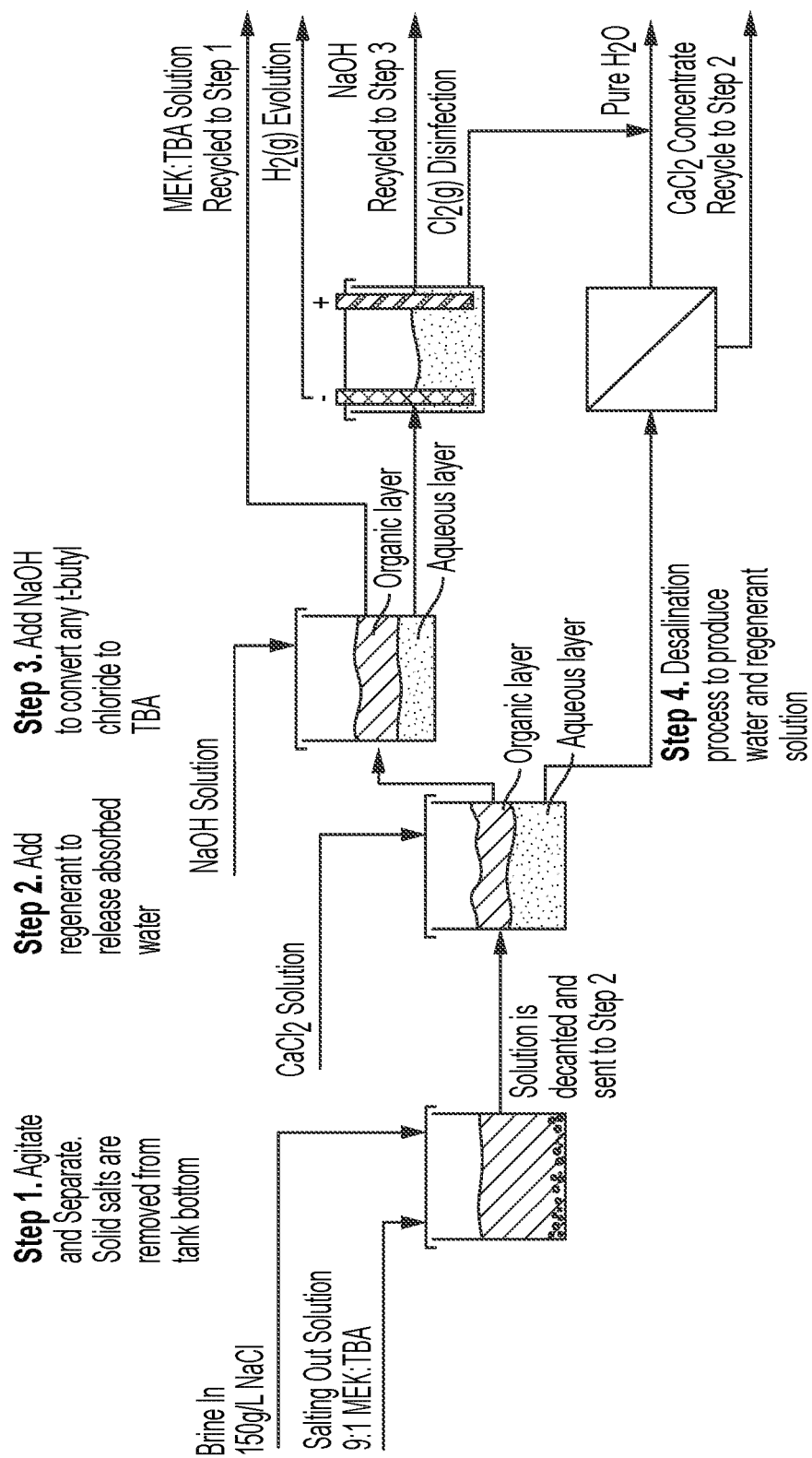
FIG. 6 shows an illustrative flowchart of a method for recovering water from a salt solution in accordance with some embodiments disclosed herein

In some embodiments, the base solution can be regenerated as shown in FIG. 6. For example, the second aqueous phase can be electrolyzed to regenerate the base solution. This regenerated base solution can be recycled to be used as the base solution that is mixed with the removed organic phase from the second container. As shown in FIG. 6, when the NaOH is added, it can react with t-butyl chloride and produce NaCl salt. The third container or an additional container can be fitted with electrodes and run as an electrolyzer. During electrolysation, water can be split to form hydrogen gas, which consumes protons in the stream and leads to an increase in pH. By running the electrolyzer at conditions sufficient to oxidize dissolved chloride ions to chlorine gas, the increased OH concentration has no other ion to hydrolyze, and NaOH can be formed. The chlorine gas produced can be used to disinfect the purified water that is produced from the desalination process.

The aqueous phase removed from the second container can be desalinated to produce purified water. The desalination process could be a membrane process, such as reverse osmosis or electrodialysis, or a thermal process, such as distillation. The membrane processes can be preferred due to their much lower energy requirements. The desalination process can be run such that the product quality meets the customer's requirements (e.g. drinking water or irrigation water), while the brine is concentrated to match the concentration of the regenerant stream. As such, the desalination process can produce purified water while also concentrating the regenerant solution to be reused in the second container for mixing with the water-absorbed salting out solution. Accordingly, desalinating the aqueous phase from the second container can produce a recycled regenerant solution to be used as the regenerant solution mixed with the water-absorbed salting out solution in the second container.

EXAMPLES

FIG. 7 shows the results of screening experiments to determine the most appropriate chemical combinations and ratios to use for the salting out and water recovery portions. The testing was set up to quickly determine which chemicals were capable of absorbing water and salting out the added brine and then also capable of desorbing that water when in the presence of a chemical additive. Only solutions that recovered 100% of the water added and were able to salt out the brine on the second cycle were considered for further study.

Example 1: A 1:100 volumetric ratio of tert-butyl alcohol (TBA) and methyl ethyl ketone (MEK) salting out solution was prepared. A 150 grams per liter sodium chloride solution was introduced to the salting out solution. After adding 0.1 mL of the salt solution to 10 mL of the TBA:MEK solution, salt precipitation occurred. The maximum volume of the salt solution that can be added to the TBA:MEK solution was 0.3 mL. Addition of salt solution beyond the maximum volume leads to the formation of an aqueous layer with salt precipitate at the bottom of the vial.

The TBA:MEK solution was decanted, and the salt was then dried. A saturated calcium chloride solution was used to extract the water absorbed in the organic salting out solution. Addition of calcium chloride results in the desorption of water from the TBA:MEK solution by (1) reacting with TBA to form tert-butyl chloride and (2) absorption of water. It was observed that addition of 0.1 mL saturated calcium chloride to the salting out solution extracts 0.1 mL water, and 100% water recovery can be achieved by adding 1.0 mL calcium chloride solution. It should also be noted that two layers were formed: TBA:MEK solution (top layer) and aqueous calcium chloride solution (bottom layer).

The TBA:MEK solution was decanted and 0.3 mL of 50% (w/v) sodium hydroxide was added. This step is required to regenerate the salting out solution by converting any tert-butyl chloride to tert-butyl alcohol. Two phases again formed and the salting out solution layer (top) was decanted.

To check if the recycled TBA:MEK solution can effectively salt out, 0.3 mL of 150 grams per liter salt solution was added. Salt crystallization was again observed together with an aqueous layer at the bottom of the vial.

Example 2

The salting out solution was optimized to achieve an ideal balance between a strong adherence to water, such that it can precipitate the crystallization event, but not so strong that the water from the salt solution drags the organic material into the aqueous solution.

Different ratios of TBA, MIBK/MEK, TiBP, and hexanes were prepared. The following table shows the performance of some blends according to (1) the amount of liquid absorbed by the salting out solution and (2) amount of organic solvent dissolved in the 50 ppt KCl aqueous layer.

| % TBA | % MEK | % MIBK | % TiBP | % Hexanes | Max. volume of water absorbed (mL) | Initial volume of 50 ppt KCl (mL) | Volume of 50 ppt KCl after extraction (mL) | % Recovery | Total Organic Carbon (mg/L) |
|---|---|---|---|---|---|---|---|---|---|
| 1 | 99 | 0 | 0 | 0 | 0.20 | 2 | 2.5 | 250 | 150 |
| 1 | 89 | 0 | 0 | 10 | 0.20 | 2 | 2.3 | 150 | 152 |
| 1 | 0 | 89 | 0 | 10 | 0.04 | 2 | 2.1 | 250 | 6 |
| 20 | 0 | 40 | 0 | 40 | 0.10 | 2 | 2.2 | 200 | 75 |
| 20 | 0 | 40 | 20 | 20 | 0.13 | 2 | 2.2 | 154 | 73 |

As shown in the table, the % recoveries after extraction with 50 ppt KCl were all above 100%, suggesting the presence of organic contamination in the aqueous layer. The salting out solutions containing MEK both resulted in high total organic carbon (TOC) content. Therefore, the less polar MIBK was used as a substitute. This change resulted in a significant decrease in the TOC content however, the water capacity dropped from 0.2 to 0.04 mL.

To increase the water capacity, the amount of TBA was increased to 20%. To minimize the dissolution of TBA in water, the amount of hexanes in the salting out solution was increased to 40%. This change in formulation resulted in the reduction of TOC (compared to the MEK solutions) and increase in the water capacity (compared to the 1:89:10 TBA:MIBK:Hexanes solutions). To further improve the formulation, an amphiphilic oxygenate was added to the salting out solution. Both tributyl phosphate (TBP) and triisobutyl phosphate (TiBP) were considered however, TiBP was selected because it is more stable and less toxic comparatively. Addition of TiBP improved the water absorption capacity by 30% while maintaining the TOC at 73 mg/L.

Additional Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters. For example, a statement that an electrode has a thickness of at least about 5 cm, about 10 cm, or about 15 cm is meant to mean that the electrode has a thickness of at least about 5 cm, at least about 10 cm, or at least about 15 cm.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

The invention claimed is:

1. A method for recovering water from a salt solution, comprising:
   mixing a salt solution and a salting out solution in a first container to form solid salt and a water-absorbed salting out solution, wherein the salting out solution comprises an enolizable ketone and an alcohol;
   removing the water-absorbed salting out solution from the first container;

mixing the water-absorbed salting out solution with a regenerant solution in a second container to release absorbed water from the water-absorbed salting out solution and form an organic phase and an aqueous phase in the second container;

removing the aqueous phase from the second container;

desalinating the aqueous phase to produce purified water.

2. The method of claim 1, further comprising removing the organic phase from the second container and mixing the removed organic phase with a base solution in a third container to form a second organic phase and a second aqueous phase.

3. The method of claim 2, further comprising electrolyzing the second aqueous phase to form a recycled base solution.

4. The method of claim 3, recycling the recycled base solution to be used as the base solution mixed with the removed organic phase.

5. The method of claim 2, further comprising recycling the second organic phase to be used as the salting out solution mixed with the salt solution in the first container.

6. The method of claim 2, wherein the base solution comprises NaOH.

7. The method of claim 1, wherein desalinating the aqueous phase produces a recycled regenerant solution and the recycled regenerant solution is recycled to be used as the regenerant solution mixed with the water-absorbed salting out solution in the second container.

8. The method of claim 1, wherein the enolizable ketone has the chemical formula:

R(C=O)R', wherein R and R' are independently selected from a C1-C7 alkyl or a C3- C7 monocyclic; R and R' are selected from a C1-C7 alkyl and the other is selected from a C1-C7 alkyl; R and R' together, with the carbonyl (C=0) form a 3-15 membered monocylic ketone or a 3-15 membered monocylic heterocyclic ketone; or R and R' together with the carbonyl form an 8-15 membered aromatic system optionally including one or more heteroatoms selected from S, N, or O.

9. The method of claim 8, wherein the enolizable ketone is methyl ethyl ketone (MEK).

10. The method of claim 1, wherein the alcohol is a tertiary alcohol.

11. The method of claim 10, wherein the tertiary alcohol is tert-butyl alcohol (TBA).

12. The method of claim 1, wherein the salt solution comprises salt water and/or a brine solution.

13. The method of claim 1, wherein the regenerant solution comprises $CaCl_2$.

14. A method for recovering water from a salt solution, comprising:

mixing a salt solution and a salting out solution in a first container to form solid salt and a water-absorbed salting out solution, wherein the salting out solution comprises a ketone, an alcohol, an amphiphilic oxygenate, and a demulsifier;

removing the water-absorbed salting out solution from the first container;

mixing the water-absorbed salting out solution with a regenerant solution in a second container to release absorbed water from the water-absorbed salting out solution and form an organic phase and an aqueous phase in the second container;

removing the aqueous phase from the second container;

desalinating the aqueous phase to produce purified water.

15. The method of claim 14, further comprising removing the organic phase from the second container and mixing the removed organic phase with a base solution in a third container to form a second organic phase and a second aqueous phase.

16. The method of claim 15, further comprising electrolyzing the second aqueous phase to form a recycled base solution.

17. The method of claim 16, recycling the recycled base solution to be used as the base solution mixed with the removed organic phase.

18. The method of claim 15, further comprising recycling the second organic phase to be used as the salting out solution mixed with the salt solution in the first container.

19. The method of claim 15, wherein the base solution comprises NaOH.

20. The method of claim 14, wherein desalinating the aqueous phase produces a recycled regenerant solution and the recycled regenerant solution is recycled to be used as the regenerant solution mixed with the water-absorbed salting out solution in the second container.

21. The method of claim 14, wherein the ketone comprises methyl isobutyl ketone (MIBK).

22. The method of claim 14, wherein the alcohol comprises a branched alcohol.

23. The method of claim 22, wherein the branched alcohol comprises t-butanol (TBA).

24. The method of claim 14, wherein the amphiphilic oxygenate comprises one of a sulfonate or a phosphate.

25. The method of claim 24, wherein the amphiphilic oxygenate comprises triisobutyl phosphate.

26. The method of claim 14, wherein the demulsifier comprises hexanes.

27. The method of claim 14, wherein the salt solution comprises salt water and/or a brine solution.

28. The method of claim 14, wherein the regenerant solution comprises KCl.

29. A method, comprising mixing a salt solution and a salting out solution to form solid salt and a water-absorbed salting out solution, wherein the salting out solution comprises an enolizable ketone and an alcohol;

mixing the water-absorbed salting out solution with a regenerant solution to release absorbed water from the water-absorbed salting out solution and to regenerate the enolizable ketone; and regenerating the alcohol using a base solution.

30. A method, comprising mixing a salt solution and a salting out solution to form solid salt and a water-absorbed salting out solution, wherein the salting out solution comprises a ketone, an alcohol, an amphiphilic oxygenate, and a demulsifier;

mixing the water-absorbed salting out solution with a regenerant solution to release absorbed water from the water-absorbed salting out solution and to regenerate the ketone; and regenerating the alcohol using a base solution.

\* \* \* \* \*